United States Patent
Costales et al.

(10) Patent No.: US 8,555,091 B2
(45) Date of Patent: Oct. 8, 2013

(54) DYNAMIC POWER STATE DETERMINATION OF A GRAPHICS PROCESSING UNIT

(75) Inventors: Edward Costales, West Sacramento, CA (US); Robert F. Kubick, El Dorado Hills, CA (US); Abdul R. N, Karnataka State (IN)

(73) Assignee: Intel Corporation, Santa Clara, CA (US)

( * ) Notice: Subject to any disclaimer, the term of this patent is extended or adjusted under 35 U.S.C. 154(b) by 434 days.

(21) Appl. No.: 12/912,905

(22) Filed: Oct. 27, 2010

(65) Prior Publication Data

US 2011/0154069 A1   Jun. 23, 2011

(30) Foreign Application Priority Data

Dec. 23, 2009   (IN) .................. 2696/DEL/2009

(51) Int. Cl.
  *G06F 1/00*   (2006.01)
  *G06F 1/32*   (2006.01)

(52) U.S. Cl.
  USPC ......................... 713/300; 713/320; 713/322

(58) Field of Classification Search
  USPC ........................................................ 713/300
  See application file for complete search history.

(56) References Cited

U.S. PATENT DOCUMENTS

| | | | |
|---|---|---|---|
| 4,088,980 A | 5/1978 | Tanigawa et al. | |
| 4,378,557 A | 3/1983 | Murata | |
| 5,049,796 A | 9/1991 | Seraji | |
| 5,491,704 A | 2/1996 | Duron | |
| 5,781,783 A | 7/1998 | Gunther et al. | |
| 5,812,860 A * | 9/1998 | Horden et al. | 713/322 |
| 5,987,614 A | 11/1999 | Mitchell et al. | |
| 6,005,549 A | 12/1999 | Forest | |
| 6,088,794 A | 7/2000 | Yoon et al. | |
| 6,115,823 A | 9/2000 | Velasco et al. | |
| 6,141,762 A * | 10/2000 | Nicol et al. | 713/300 |
| 6,151,652 A | 11/2000 | Kondo et al. | |
| 6,333,750 B1 | 12/2001 | Odryna et al. | |
| 6,351,529 B1 | 2/2002 | Holeva | |
| 6,351,850 B1 | 2/2002 | van Gilluwe et al. | |
| 6,429,840 B1 | 8/2002 | Sekiguchi | |
| 6,466,829 B1 | 10/2002 | Sickler | |
| 6,509,911 B1 | 1/2003 | Shimotono | |
| 6,532,506 B1 | 3/2003 | Dunstan et al. | |
| 6,539,443 B1 | 3/2003 | Dunstan et al. | |
| 6,640,145 B2 | 10/2003 | Hoffberg et al. | |
| 6,677,991 B1 | 1/2004 | Ito | |
| 6,691,236 B1 * | 2/2004 | Atkinson | 713/320 |
| 6,704,875 B1 | 3/2004 | Kinoshita et al. | |
| 6,704,879 B1 * | 3/2004 | Parrish | 713/322 |
| 6,763,226 B1 | 7/2004 | McZeal, Jr. | |
| 6,771,250 B1 | 8/2004 | Oh | |
| 6,944,229 B2 * | 9/2005 | Son et al. | 375/240.25 |
| 6,967,522 B2 | 11/2005 | Chandrakasan et al. | |

(Continued)

*Primary Examiner* — Suresh Suryawanshi
(74) *Attorney, Agent, or Firm* — Buckley, Maschoff & Talwalkar LLC (57) ABSTRACT

According to some embodiments, a method and apparatus are provided to determine a first operating point and a second operating point associated with a graphics processing unit, automatically determine a plurality of voltage/frequency values between the first operating point and the second operating point, and define a plurality of power states of the graphic processing unit. One or more of the power states may be associated with one of the plurality of voltage/frequency values. Each of the plurality of voltage/frequency values may include both a voltage and a frequency.

23 Claims, 5 Drawing Sheets

(56) References Cited

U.S. PATENT DOCUMENTS

| | | | |
|---|---|---|---|
| 6,996,441 B1 | 2/2006 | Tobias | |
| 7,006,881 B1 | 2/2006 | Hoffberg et al. | |
| 7,017,053 B2 | 3/2006 | Mizuyabu et al. | |
| 7,020,786 B2 | 3/2006 | Vyssotski et al. | |
| 7,023,192 B2 | 4/2006 | Sutardja et al. | |
| 7,027,032 B2 | 4/2006 | Rosenberg et al. | |
| 7,036,032 B2 | 4/2006 | Mizuyabu et al. | |
| 7,053,594 B2 | 5/2006 | Sutardja et al. | |
| 7,111,179 B1 | 9/2006 | Girson et al. | |
| 7,114,086 B2 | 9/2006 | Mizuyabu et al. | |
| 7,130,807 B1 | 10/2006 | Mikurak | |
| 7,143,215 B2 | 11/2006 | Dunstan et al. | |
| 7,161,590 B2 | 1/2007 | Daniels | |
| 7,166,966 B2 | 1/2007 | Naugler, Jr. et al. | |
| 7,181,370 B2 | 2/2007 | Furem et al. | |
| 7,188,261 B1 * | 3/2007 | Tobias et al. | 713/300 |
| 7,190,338 B2 | 3/2007 | Kubota et al. | |
| 7,243,246 B2 | 7/2007 | Allen et al. | |
| 7,243,254 B1 | 7/2007 | Kuroodi et al. | |
| 7,339,570 B2 | 3/2008 | Kubota et al. | |
| 7,343,484 B2 | 3/2008 | Du et al. | |
| 7,562,233 B1 * | 7/2009 | Sheng et al. | 713/300 |
| 7,609,047 B2 | 10/2009 | Ravichandran | |
| 7,941,675 B2 * | 5/2011 | Burr et al. | 713/300 |
| 8,250,395 B2 * | 8/2012 | Carter et al. | 713/322 |
| 8,370,658 B2 * | 2/2013 | Sheng et al. | 713/320 |
| 2002/0040442 A1 | 4/2002 | Ishidera | |
| 2002/0075249 A1 | 6/2002 | Kubota et al. | |
| 2002/0091991 A1 | 7/2002 | Castro | |
| 2003/0051183 A1 | 3/2003 | Lo et al. | |
| 2003/0059020 A1 | 3/2003 | Meyerson et al. | |
| 2003/0085621 A1 | 5/2003 | Potega | |
| 2003/0103088 A1 | 6/2003 | Dresti et al. | |
| 2003/0160239 A1 | 8/2003 | Shinagawa et al. | |
| 2003/0169247 A1 | 9/2003 | Kawabe et al. | |
| 2003/0188144 A1 | 10/2003 | Du et al. | |
| 2004/0178785 A1 | 9/2004 | Sutardja et al. | |
| 2004/0196016 A1 | 10/2004 | Sutardja et al. | |
| 2004/0236969 A1 | 11/2004 | Lippert et al. | |
| 2004/0259542 A1 | 12/2004 | Viitamaki et al. | |
| 2005/0046396 A1 | 3/2005 | Patterson | |
| 2005/0071698 A1 | 3/2005 | Kangas | |
| 2005/0086280 A1 | 4/2005 | Thuerk | |
| 2005/0134578 A1 | 6/2005 | Chambers et al. | |
| 2005/0138437 A1 | 6/2005 | Allen et al. | |
| 2005/0151571 A1 | 7/2005 | Brown et al. | |
| 2005/0240538 A1 | 10/2005 | Ranganathan | |
| 2005/0243588 A1 | 11/2005 | Kubota et al. | |
| 2005/0263765 A1 | 12/2005 | Maekawa | |
| 2006/0022657 A1 | 2/2006 | Sutardja et al. | |
| 2006/0080062 A1 | 4/2006 | Bose et al. | |
| 2006/0250377 A1 | 11/2006 | Zadesky et al. | |
| 2006/0265609 A1 | 11/2006 | Fung | |
| 2007/0094525 A1 | 4/2007 | Uguen et al. | |
| 2007/0103122 A1 | 5/2007 | Morong et al. | |
| 2007/0145962 A1 | 6/2007 | Huang et al. | |
| 2007/0146354 A1 | 6/2007 | Kubota et al. | |
| 2007/0225951 A1 | 9/2007 | Eryilmaz et al. | |
| 2008/0016468 A1 | 1/2008 | Chambers et al. | |
| 2008/0030182 A1 | 2/2008 | Sutardja et al. | |
| 2008/0059814 A1 | 3/2008 | Esliger | |
| 2008/0126803 A1 | 5/2008 | Ginter et al. | |
| 2008/0130322 A1 | 6/2008 | Artusi et al. | |
| 2008/0157743 A1 | 7/2008 | Martin et al. | |
| 2008/0169796 A1 | 7/2008 | Buethker et al. | |
| 2008/0195878 A1 | 8/2008 | Meijer et al. | |
| 2008/0232141 A1 | 9/2008 | Artusi et al. | |
| 2008/0238380 A1 | 10/2008 | Jain | |
| 2008/0243899 A1 | 10/2008 | Staudinger et al. | |
| 2008/0252280 A1 | 10/2008 | Prodic et al. | |
| 2008/0307240 A1 | 12/2008 | Dahan et al. | |

* cited by examiner

100

Determine, via a processor, a first operating point and a second operating point associated with a graphics processing unit

101

Automatically determine a plurality of voltage/frequency values between the first operating point and the second operating point, each of the plurality of voltage/frequency values including both a voltage and a frequency

102

Define a plurality of power states of the graphic processing unit, one or more of the power states associated with one of the plurality of voltage/frequency values

DYNAMIC POWER STATE DETERMINATION OF A GRAPHICS PROCESSING UNIT

BACKGROUND

A portable computer may include a graphics processing unit (e.g., a graphics processor). Graphics processors consume significant battery power. In some situations, a user may be using the portable computer for simple tasks that do not require a full voltage and frequency of a graphics processor. In this situation, the power and frequency used by the graphics processor may be reduced to save battery reserves. To reduce power consumption, the graphics processor may operate in one of several power-performance states (i.e., P-states). P-states may indicate a voltage and frequency in which the graphics processor will operate. For example, P-state zero (i.e., P0) may be a highest-performance state that indicates the graphics processor will operate at a maximum voltage and a maximum frequency.

The graphics processor may be associated with a plurality of P-states such as P0 through Pn, where n is an integer greater than 0. P-states, such as P1 through Pn, may be successively lower-performance states than P0 where each has a scaled down voltage and frequency. For example, P1 will be associated with a slower frequency and lower voltage than P0 and P2 will be associated with a slower frequency and lower voltage than P1.

DETAILED DESCRIPTION

Figure 1:
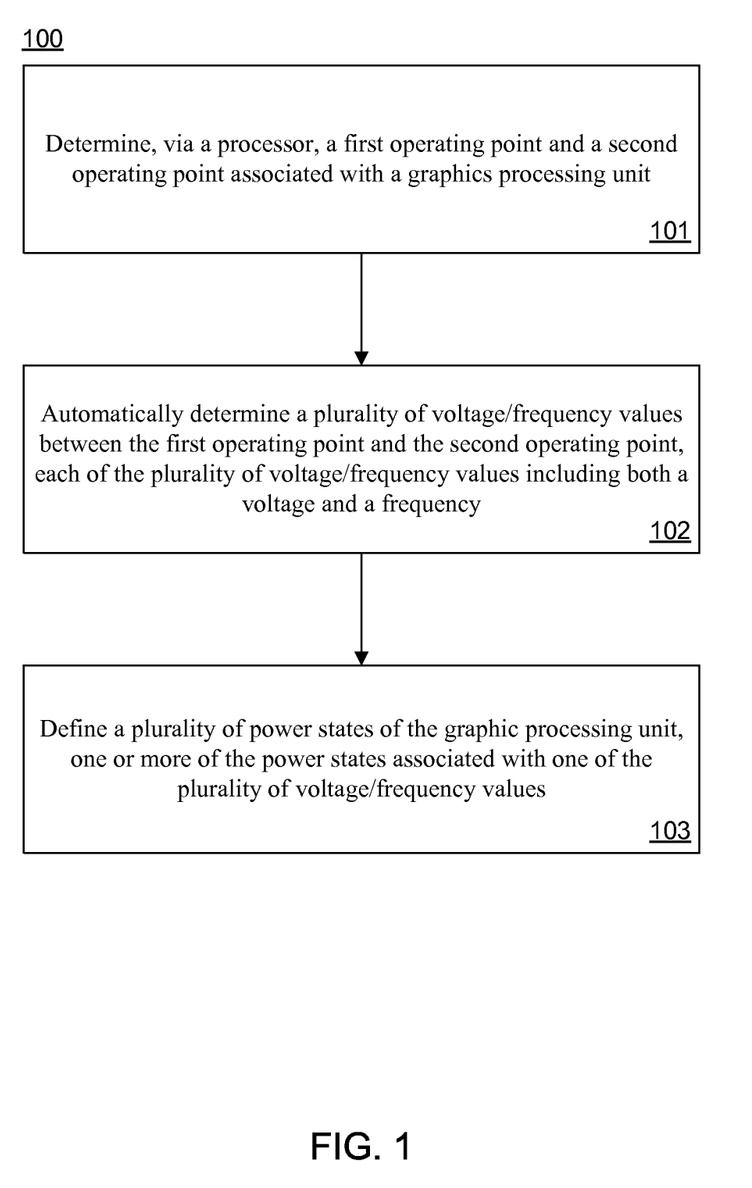
FIG. 1 illustrates a method according to some embodiments.

Referring now to FIG. 1, an embodiment of a method 100 is shown. Method 100 may be performed by a system such as, but not limited to, the system described with respect to FIG. 2. Referring to FIG. 1, at 101, a first operating point and a second operating point associated with a graphics processing unit may be determined by a processor. In some embodiments, a graphics processing unit may comprise a first register to store the first operating point and a second register to store the second operating point. In some embodiments the processor may comprise a central processing unit. However, in other embodiments, the processor may comprise a processor contained within a graphical processing unit.

At a time of startup, the first operating point and the second operating point may be determined (e.g., read) by a computer processor. Each operating point may be defined by a voltage and a frequency associated with the graphics processing unit. In one embodiment, the first register may be a Turbo register that stores a maximum voltage and a maximum frequency at which the graphics processing unit may operate. The second register may comprise a Thermal Design Power (TDP) register that indicates a voltage/frequency to operate the graphics processing unit that is lower than the voltage and frequency values stores in the Turbo register. In some embodiments, the TDP register may indicate a lowest voltage/frequency to operate the graphics processing unit. In some embodiments, the voltage values and frequency values that are populated into the Turbo and TDP registers are determined at a time of manufacture of the graphics processing unit.

For illustrative purposes, and to aid in understanding features of the specification, an example will now be introduced. This example will be carried through the detailed description and this example is not intended to limit the scope of the claims. For example, at a time of manufacture a graphics processing unit may be tested by testing equipment. The testing equipment may determine that a maximum operating voltage for the graphics processing unit is 1.53 volts and that a maximum operating frequency for the graphics processing unit is 833 MHz. The testing equipment may then store the 1.53 volts value and 833 MHz value into the graphic processing unit's Turbo register. Next, the testing equipment may determine that a lowest operating point for the graphic processing unit may comprise a voltage of 1.10 volts and a frequency of 496 MHz. These values may also be stored in a register of the graphics processing unit. Once installed in a portable computer, at a time of startup, the first operating point (1.53 V/833 MHz) and the second operating point (1.10 V/496 MHz) may be read by a computer processor.

A plurality of voltage/frequency values between the first operating point and the second operating point are automatically determined at 102, where each of the plurality of voltage/frequency values may comprise both a voltage and a frequency. The determined values may be stored in one or more registers in a chip set associated with the graphics processing unit.

In some embodiments, automatically determining values between the first operating point and the second operating point may comprise plotting the first operating point and the second operating point on a graph and calculating a line on the graph between the first operating point and the second operating point. In some embodiments, the graph may an electrically determined graph that is determined by a computer processor. The plurality of voltage/frequency values may comprise values that are decremented from the first operating point by a fixed voltage amount or by a fixed frequency amount. For example, each plurality of voltage/frequency values may comprise a frequency that is decremented by X MHz, where X is a value greater than zero. In some embodiments, each of the plurality of voltage/frequency values may comprise a voltage that is decremented by Y volts, where Y is a value greater than zero. In the case that a frequency that is decremented by X MHz, once the frequency is decremented, a corresponding voltage value on the graph may be used to complete a voltage component of a voltage/frequency value. In this regard, a difference between the frequency associated with the first operating point and the frequency associated with the first of the plurality of voltage/frequency values is substantially equal to a difference between the frequency associated with the first of the plurality voltage/frequency value and the frequency associated with the second of the plurality of voltage/frequency values. Or in other words, $f_0 - f_1 = f_1 - f_2$.

In some embodiments, a first voltage/frequency value of the plurality of voltage/frequency values may be associated with a voltage that is less than a voltage associated with the first operating point and may also be associated with a frequency that is less than a frequency associated with the first operating point. A second voltage/frequency value of the plurality of voltage/frequency values may be associated with a voltage that is less than the voltage associated with the first voltage/frequency value of the plurality of voltage/frequency values and may be associated with a frequency that is less than the frequency associated with the first of the plurality of voltage/frequency values.

Figure 3:
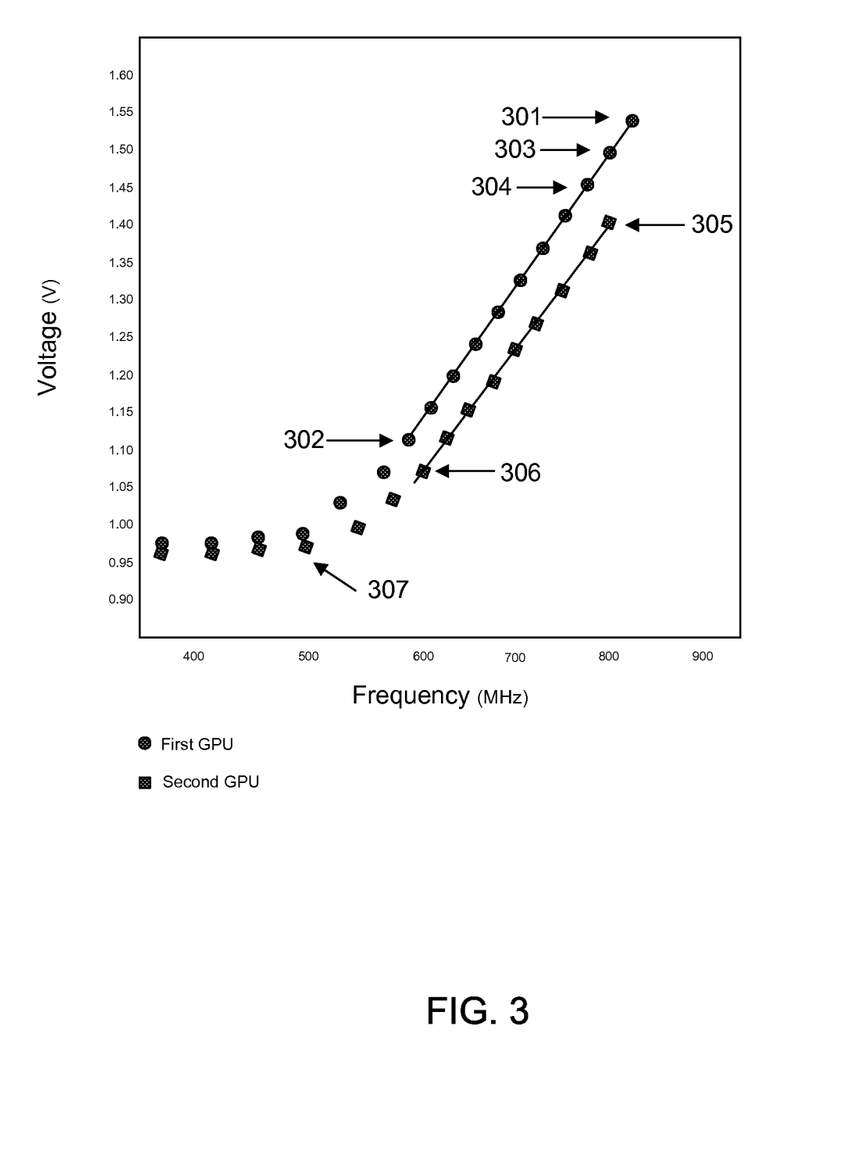
FIG. 3 illustrates a graph associated with voltages and frequencies according to some embodiments.

Continuing with the above example and now referring to FIG. 3, each plurality of voltage/frequency values may comprise a frequency that is decremented by 33 MHz. Therefore, if we consider the first operating point (1.53 V/833 MHz) as illustrated as 301 in FIG. 3 and the second operating point (1.10 V/496 MHz) as illustrated as 302 a line may be drawn between the first operating point and the second operating point. A plurality of points may be defined along the line drawn between the first operating point and the second operating point. A first voltage/frequency value may be associated with a point along the line that is 33 MHz less than the first operating point as illustrated at 303. Therefore, according to the graph, a first of the plurality of voltage/frequency values may comprise a voltage/frequency value of (1.49 V/800 MHz). Similarly, a second of the plurality of voltage/frequency values, as illustrated at 304, may comprise a frequency that is 33 MHz less than the first of the plurality of voltage/frequency values and thus may comprise a voltage/frequency value of (1.45V/767 MHz).

Referring back to FIG. 1, next at 103, a plurality of power states of the graphic processing unit may be defined where one or more power states may be associated with one of the plurality of voltage/frequency values. In some embodiments, the first operating point may be associated with a first power state. In some embodiments, each power state may be associated with one of the plurality of voltage/frequency values.

Continuing with the above example, and again referring to FIG. 3, each plurality of voltage/frequency values may be associated with a particular power state. For example, if we consider the first operating point (1.53 V/833 MHz), as illustrated at 301, as P0 (i.e., a power state associated with a maximum voltage and a maximum frequency), P1 may be associated with the voltage/frequency value as illustrated at 302 and P2 may be associated with the voltage/frequency value as illustrated at 303. While only 3 power states (i.e., P0, P1, P2) are described, any number of power states may be defined.

Figure 2:
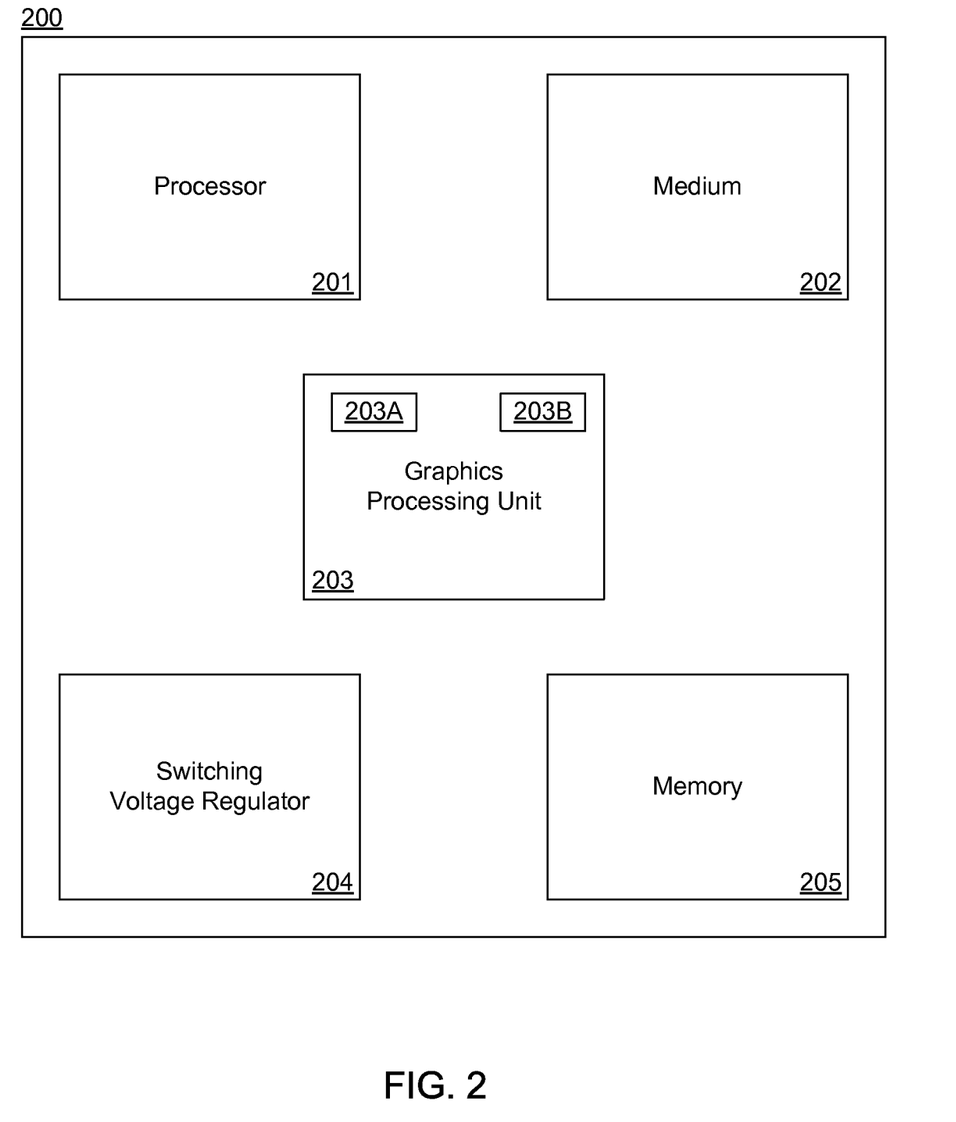
FIG. 2 illustrates a system according to some embodiments.

Now referring to FIG. 2, an embodiment of a system 200 is illustrated according to some embodiments. The system 200 may comprise a processor 201, a medium 202, a graphics processing unit 203, a switching voltage regulator 204, and memory 205.

The memory 205 may store, for example, applications, programs, procedures, and/or modules that store instructions to be executed. The memory 205 may comprise, according to some embodiments, any type of memory for storing data, such as a Single Data Rate Random Access Memory (SDR-RAM), a Double Data Rate Random Access Memory (DDR-RAM), or a Programmable Read Only Memory (PROM).

The processor 201 may include or otherwise be associated with dedicated registers, stacks, queues, etc. that are used to execute program code and/or one or more of these elements may be shared there between.

The medium 202 may comprise any computer-readable medium that may store instructions to be executed by the processor 201. For example, the medium 202 may comprise, but is not limited to, a compact disk, a digital video disk, flash memory, optical storage, random access memory, read only memory, or magnetic media.

The graphics processing unit (GPU) 203 may comprise a first register 203A and a second register 203B. In some embodiments, the first register 203A and the second register 203B may comprise fuse registers. While two registers are illustrated, the GPU 203 may comprise any number of registers. For example, the GPU's 203 first register 203A may comprise a Turbo register, the second register 203B may comprise a TDP register and a third register (not shown) may comprise a lowest frequency mode (LFM) register. At a time of manufacture of the GPU 203, each register may be populated with information associated with the GPU 203.

The switching voltage regulator 204 may comprise any switching voltage regulator that is, or will be, known. In some embodiments, the switching voltage regulator 204 may control a voltage and a frequency associated with power provided to the GPU 203. In some embodiments, the switching voltage regulator may be controlled by the processor 201 to regulate a voltage and frequency that is supplied to the GPU 203. The switching voltage regulator 204 may be controlled based on the first operating point 203A, the second operating point 203B, and a plurality of voltage/frequency values.

Referring now to FIG. 3, at a time of manufacture each manufactured GPU may be associated with values that define a first operating point and a second operating for each respective GPU. The values that define the first operating point and the second operating point may be stored in the first register 203A and the second register 203B respectively. As illustrated in FIG. 3, a first operating point 301 for a first GPU may be different than a first operating point 305 for a second GPU. Likewise, a second operating point 302 for a first GPU may be different from a second operating point 306 for a second GPU.

In some embodiments, an LFM may correspond to a most efficient operating point. As illustrated at 307 of FIG. 3, the operating points for two different GPUs may correspond to a same voltage and frequency point. In some embodiments, the same voltage and frequency operating points for two or more GPUs may correspond to a LFM. In some embodiments, a LFM may be stored in a GPU register during a time of manufacture and/or testing process. In this embodiment an operating point associated with the stored LFM may be used as a second operating point instead of an operating point associated with a TDP. Using LFM as a second operating point may facilitate more efficient use of power in a GPU.

Figure 5:
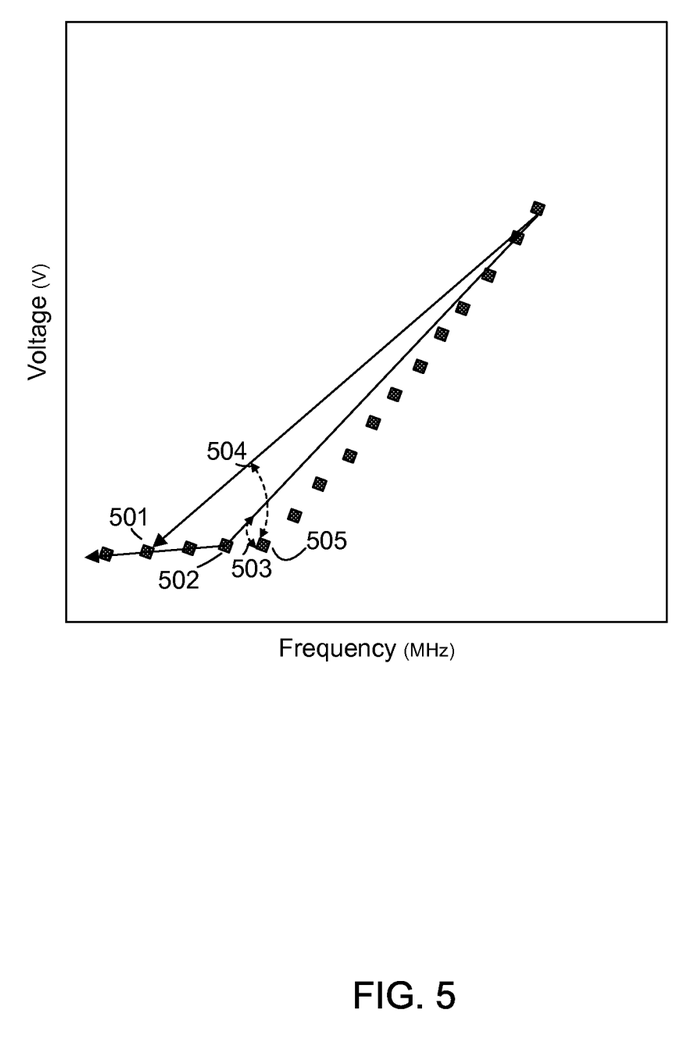
FIG. 5 illustrates a graph associated with voltages and frequencies according to some embodiments.

In some embodiments, an LFM register or a third general purpose register (i.e., fuse) may be used to store an LFM. That is, a flag may be set to indicate that an equation (e.g., a linear equation) may use the values associated with the Turbo register, the TDP register, and the LFM register. In some embodiments, using the values associated with the LFM register rather than the TDP register may improve efficiency as illustrated in FIG. 5. For example, using the TDP point 501, would result in a 175 mV difference, as illustrated at 504, from the 500 MHz point 505 and using the LFM point 502 would result in a 87.5 mV difference, as illustrated at 503. According to some embodiments, using a third data point allows for two linear fit lines to be used increasing the efficiency greatly.

Figure 4:
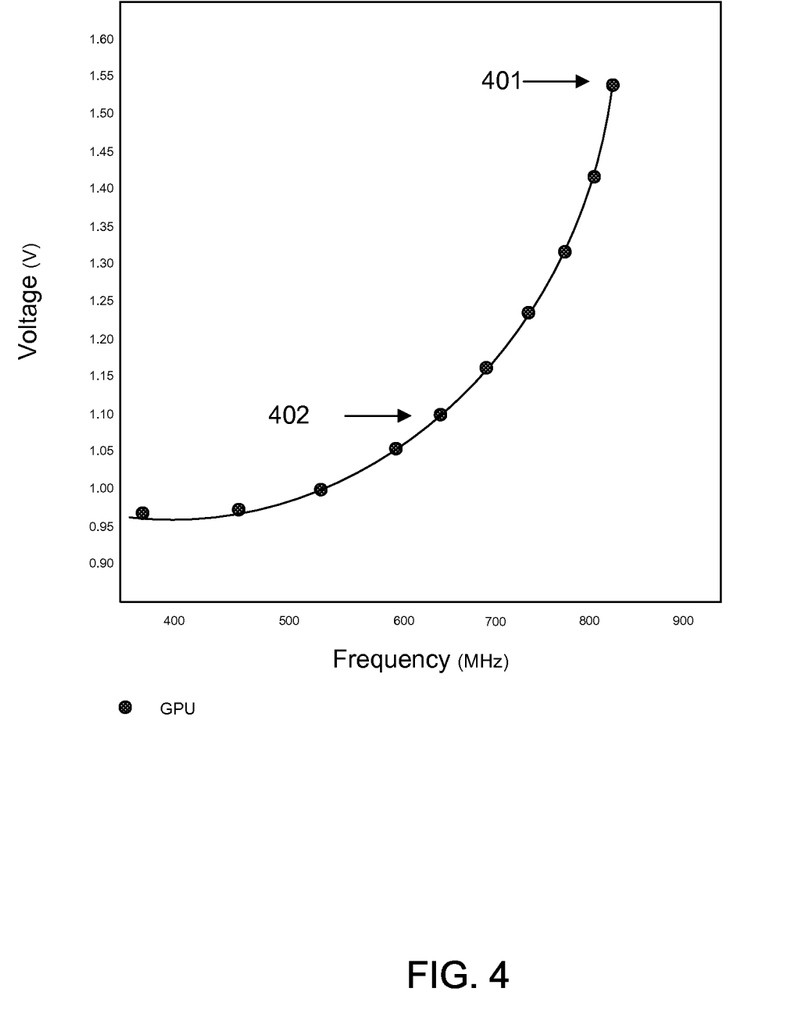
FIG. 4 illustrates a graph associated with voltages and frequencies according to some embodiments.

As illustrated in FIG. 3, a linear algorithm may be used to define the plurality of voltage/frequency values associated with the first operating point and the second operating point. However, in some embodiments, and referring to FIG. 4, a polynomial algorithm may be use to fit the plurality of voltage/frequency points between a first operating point 401 and a second operating point 402. In a case that a polynomial algorithm is used, a median fit line equation may be moved up or down depending on a calculated offset. The offset may be calculated using a value stored in a Turbo Register minus an estimated point from a median voltage ID equation. If the result is negative, then the median line may be moved down an appropriate amount or the median line may be moved up if the result is positive. In some embodiments, the offset may degrade or converge at a lower frequency and the polynomial algorithm may adjust the offset accordingly.

Various modifications and changes may be made to the foregoing embodiments without departing from the broader spirit and scope set forth in the appended claims.

What is claimed is:

1. A method comprising:
   determining a first operating point associated with a graphics processing unit using test equipment that tests the graphics processing unit at a time of manufacture;
   determining a second operating point associated with the graphics processing unit using test equipment that tests the graphics processing unit at a time of manufacture;
   reading, via a processor, the first operating point and the second operating point associated with a graphics processing unit;
   automatically determining a plurality of voltage/frequency values between the first operating point and the second operating point, each of the plurality of voltage/frequency values including both a voltage and a frequency; and
   defining a plurality of power-performance states of the graphics processing unit, one or more of the power-performance states associated with one of the plurality of voltage/frequency values.

2. The method of claim 1, further comprising:
   associating the first operating point with a first power-performance state.

3. The method of claim 1, wherein a first of the plurality of voltage/frequency values is associated with a voltage that is less than a voltage associated with the first operating point and is associated with a frequency that is less than a frequency associated with the first operating point.

4. The method of claim 3, wherein a second of the plurality of voltage/frequency values is associated with a voltage that is less than the voltage associated with the first of the plurality of voltage/frequency values and is associated with a frequency that is less than the frequency associated with the first of the plurality of voltage/frequency values.

5. The method of claim 4, wherein a difference between the frequency associated with the first operating point and the frequency associated with the first of the plurality of voltage/frequency values is substantially equal to a difference between the frequency associated with the first of the plurality voltage/frequency value and the frequency associated with the second of the plurality of voltage/frequency values.

6. The method of claim 1, wherein the first operating point and the second operating point are determined at a time of manufacture of the graphic processing unit.

7. The method of claim 1, wherein the first operating point associated with the graphics processing unit is stored in a first register associated with the graphics processing unit startup and the second operating point associated with the graphics processing unit is stored in a second register associated with the graphics processing unit.

8. The method of claim 7, wherein determining the first operating point associated with the graphics processing unit comprises:
   reading, at a time of startup, the first register.

9. The method of claim 1, further comprising:
   controlling a switching voltage regulator based on the one or more of the power-performance states.

10. An apparatus comprising:
    a medium storing program instruction that when executed by a processor cause the processor to:
    determine a first operating point and a second operating point associated with a graphics processing unit;
    automatically determine a plurality of voltage/frequency values between the first operating point and the second operating point, each of the plurality of voltage/frequency values including both a voltage and a frequency; and
    define a plurality of power-performance states of the graphic processing unit, one or more power-performance states associated with one of the plurality of voltage/frequency values;
    wherein the determine a first operating point and a second operating point associated with a graphics processing unit comprises:
        read the first operating point associated with the graphics processing unit after the first operating point is determined by test equipment that tests the graphics processing unit at a time of manufacture; and
        read the second operating point associated with the graphics processing unit after the second operating point is determined by test equipment that tests the graphics processing unit at a time of manufacture.

11. The apparatus of claim 10, further comprising:
    a switching voltage regulator that is controlled based on the first operating point, the second operating point, and the plurality of voltage/frequency values.

12. The apparatus of claim 10, wherein a first of the plurality of voltage/frequency values is associated with a voltage that is less than a voltage associated with the first operating point and is associated with a frequency that is less than a frequency associated with the first operating point.

13. The apparatus of claim 12, wherein a second of the plurality of voltage/frequency values is associated with a voltage that is less than the voltage associated with the first of the plurality of voltage/frequency values and is associated with a frequency that is less than the frequency associated with the first of the plurality of voltage/frequency values.

14. The apparatus of claim 13, wherein a difference between the frequency associated with the first operating point and the frequency associated with the first of the plurality of voltage/frequency values is substantially equal to a difference between the frequency associated with the first of the plurality voltage/frequency value and the frequency associated with the second of the plurality of voltage/frequency values.

15. The apparatus of claim 10, wherein the first operating point and the second operating point are determined at a time of manufacture of the graphics processing unit.

16. The apparatus of claim 10, wherein the first operating point is stored in a first register associated with the graphics processing unit and the second operating point is stored in a second register associated with the graphics processing unit.

17. The apparatus of claim 16, wherein determining the first operating point and determining the second operating point comprises:
    reading, at a time of startup, the first register; and
    reading, at the time of startup, the second register.

18. A system comprising:
    a graphics processing unit;
    test equipment to test the graphics processing unit at a time of manufacture and to determine a first operating point associated with the graphics processing unit;
    test equipment to test the graphics processing unit at a time of manufacture and to determine a second operating point associated with the graphics processing unit;
    a switching voltage regulator; and
    a medium storing program instruction that when executed by a processor cause the processor to:

read the first operating point and the second operating point associated with the graphics processing unit;

automatically determine a plurality of voltage/frequency values between the first operating point and the second operating point, each of the plurality of voltage/frequency values including both a voltage and a frequency; and define a plurality of power-performance states of the graphic processing unit, one or more power-performance states associated with one of the plurality of voltage/frequency values.

19. The system of claim 18, wherein the first operating point and the second operating point are determined at a time of manufacture of the graphics processing unit.

20. The system of claim 18, wherein the switching voltage regulator is controlled based on the one or more of the power-performance states.

21. The method of claim 1, further comprising:

after the determining a first operating point associated with a graphics processing unit using test equipment that tests the graphics processing unit at a time of manufacture, storing the first operating point in a first register of the graphics processing unit; and after the determining a second operating point associated with the graphics processing unit using test equipment that tests the graphics processing unit at a time of manufacture, storing the second operating point in a second register of the graphics processing unit.

22. The apparatus of claim 10, wherein the reading the first operating point associated with the graphics processing unit after the first operating point is determined by test equipment that tests the graphics processing unit at a time of manufacture comprises:

read the first operating point associated with the graphics processing unit after the first operating point is determined by test equipment that tests the graphics processing unit at a time of manufacture and stored in a first register of the graphics processing unit; and wherein the reading the second operating point associated with the graphics processing unit after the second operating point is determined by test equipment that tests the graphics processing unit at a time of manufacture comprises:

reading the second operating point associated with the graphics processing unit after the second operating point is determined by test equipment that tests the graphics processing unit at a time of manufacture and stored in a first register of the graphics processing unit.

23. The system of claim 18, wherein the read the first operating point associated with the graphics processing unit after the first operating point is determined by test equipment that tests the graphics processing unit at a time of manufacture comprises:

read the first operating point associated with the graphics processing unit after the first operating point is determined by test equipment that tests the graphics processing unit at a time of manufacture and stored in a first register of the graphics processing unit; and wherein the read the second operating point associated with the graphics processing unit after the second operating point is determined by test equipment that tests the graphics processing unit at a time of manufacture comprises:

read the second operating point associated with the graphics processing unit after the second operating point is determined by test equipment that tests the graphics processing unit at a time of manufacture and stored in a first register of the graphics processing unit.

* * * * *